Feb. 10, 1925.

T. R. COOK 1,525,851

STORAGE BATTERY SEPARATOR

Original Filed March 10, 1920

Thomas R. Cook, INVENTOR.

BY

ATTORNEY.

Patented Feb. 10, 1925.

1,525,851

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY SEPARATOR.

Continuation of application Serial No. 364,793, March 10, 1920. This application filed August 6, 1921. Serial No. 490,380.

*To all whom it may concern:*

Be it known that I, THOMAS R. COOK, a citizen of the United States, residing at Pittsburgh, in the county of Allegheny and State of Pennsylvania, have invented certain new and useful Improvements in Storage-Battery Separators, of which the following is a specification.

My invention relates to electrical batteries of the secondary or storage type, and has for an object the provision of improved means for separating the positive and the negative plates in batteries of this type.

I will describe certain forms of separating devices embodying my invention, and will then point out the novel features thereof in claims.

The present application is a continuation of my co-pending application filed on the 10th day of March, 1920, Serial No. 364,793, for storage battery separators, in so far as the subject matter common to the two is concerned.

Figure 1:
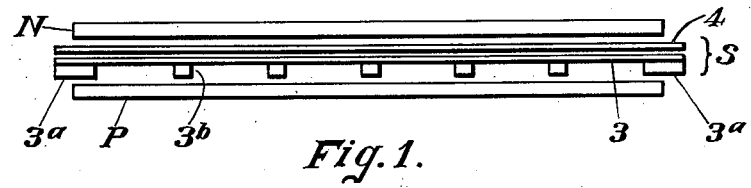
Figure 2:
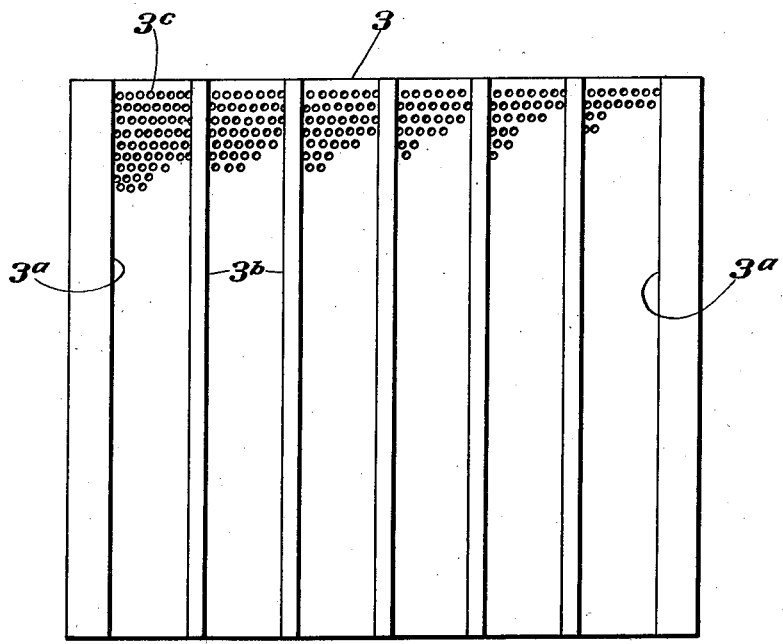

In the accompanying drawings, Fig. 1 is a top plan view showing a portion of a storage battery having applied thereto one form of separating device embodying my invention. Fig. 2 a view showing in front elevation the separator member 3 shown in Fig. 1.

Similar reference characters refer to similar parts in each of the views.

Referring first to Fig. 1, the battery comprises a positive plate P and a negative plate N, it being understood, of course, that in actual practice the battery will usually be made up of a number of such pairs of plates.

Located between the plates P and N is a separating device which is designated as a whole by the reference character S, and which, in the form herein shown, comprises a main member 3 and an auxiliary member 4.

The main separator member 3 is of suitable insulating material, such as hard rubber or celluloid, and as here shown, (see Fig. 2), it is provided with a plurality of holes 3ᶜ, the entire member being thus perforated in actual practice instead of only the upper portion as shown in the drawing. Attached to one surface of the member 3 are two end ribs 3ᵃ and a plurality of intermediate ribs 3ᵇ, which ribs project towards the positive plate P. I do not desire to limit myself to the specific form of the separator member 3 illustrated and described herein, it being understood that any other suitable form may be employed, such for example as the one disclosed and claimed in my co-pending application filed on the 11th day of March, 1920, Serial No. 364792, for storage battery separators.

The auxiliary separator member 4 is a thin sheet or web of a substance which is pervious to battery acid, but is impervious to lead particles so that it serves to prevent the formation of trees. Preferably this member contains wood or a woody material, for the reason that when certain kinds of negative plates are used, the presence of wood is necessary to secure the best results from these plates. This member may be, as examples, maple wood, wood pulp, or a combination of wood pulp with a suitable binding material. In the latter case, the binding material may be asbestos, wool, or other long fibered material which is not affected by sulphuric acid. In all cases, the member 4 is preferably very thin, such as from five thousandths to fifteen thousandths of an inch in thickness. The member 4 may be used in the untreated state, or it may be treated in any suitable manner with a caustic or an acid solution depending upon the desired degree of porosity of the wood, that is, depending on the desired voltage of the battery.

It will be noted that the ribbed surface of the main member 3 is presented to the positive plate P. This arrangement possesses certain advantages, among which are the following: The active material which leaves the positive plate and which is in a very fine condition, amounting almost to a powder, is free to drop to the bottom of the jar through the spaces between the positive plate and the body of the member 3. A certain amount of nascent oxygen is formed on the surface of the positive plate, and the construction just described provides space for this oxygen to pass freely away from the plate. Furthermore, such nascent oxygen is removed from direct association with any part of the separator, thereby avoiding acceleration of the oxidation of the separator.

Although I have herein shown and described only a few forms of separating devices embodying my invention, it is understood that various changes and modifications may be made therein within the scope of the appended claims without departing from the spirit and scope of my invention.

Having thus described my invention, what I claim is:

1. In a storage battery, a separating device comprising a main member of insulating material having ribs projecting towards the positive plate, and a thin auxiliary member of material pervious to battery acid but impervious to lead particles located between said first member and the negative plate.

2. A storage battery separating device comprising a main member of insulating material, and an auxiliary member approximately five-thousandths to fifteen-thousandths of inch thick and containing wood.

3. A storage battery separating device comprising a main member of insulating material and an auxiliary member comprising a sheet of wood approximately five to fifteen thousandths of an inch in thickness.

4. A storage battery separating device comprising a main member of insulating material and an auxiliary member comprising a sheet of maple approximately five to fifteen thousandths of an inch in thickness.

5. In a storage battery, a separating device comprising a member of insulating material provided with ribs projecting towards the positive plate, and a thin sheet of wood located between said member and the negative plate.

6. In a storage battery, a separating device comprising a perforated member of insulating material provided with ribs projecting towards the positive plate, and a thin sheet of wood located between said member and the negative plate.

7. In a storage battery, a separating device comprising a perforated sheet of insulating material having ribs on the side adjacent the positive plate, and a thin sheet of maple located between said sheet and the negative plate.

8. A storage battery comprising a positive plate, a negative plate, a main separating member of insulating material interposed between said plates and having a flat perforated sheet and vertical ribs extending toward the said positive plate, and a thin auxiliary member of wood interposed between said separator and said negative plate.

In testimony whereof I affix my signature.

THOMAS R. COOK.